W. LUXMORE.
VEHICLE DRIVING MECHANISM.
APPLICATION FILED APR. 17, 1918.

1,320,773.

Patented Nov. 4, 1919.
3 SHEETS—SHEET 2.

Inventor
William Luxmore
By Williams, Bradbury &c
Attorneys

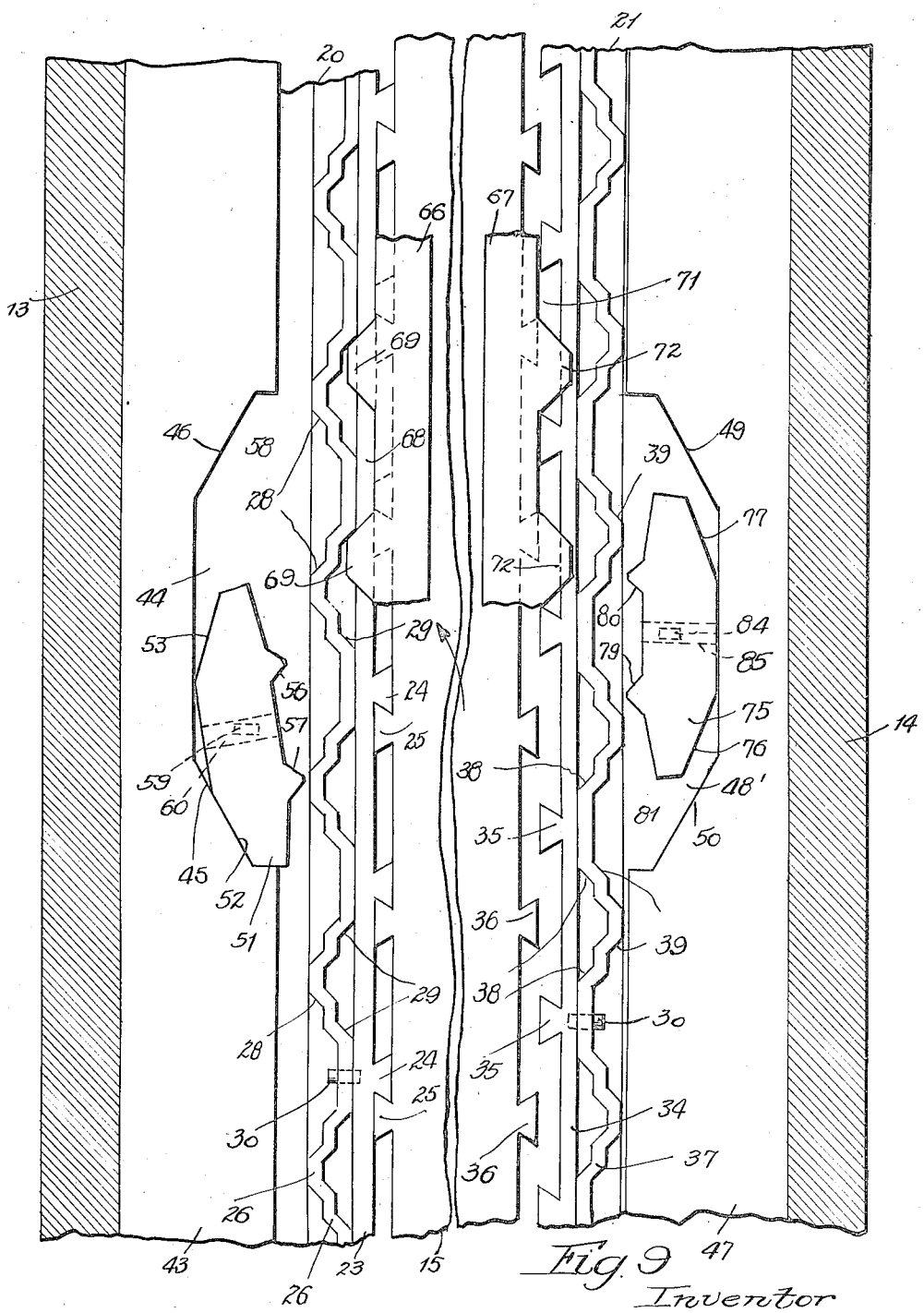

UNITED STATES PATENT OFFICE.

WILLIAM LUXMORE, OF CHICAGO, ILLINOIS.

VEHICLE DRIVING MECHANISM.

1,320,773.    Specification of Letters Patent.    Patented Nov. 4, 1919.

Application filed April 17, 1918. Serial No. 229,005.

*To all whom it may concern:*

Be it known that I, WILLIAM LUXMORE, a citizen of the United States, residing at Chicago, in the county of Cook and State of Illinois, have invented certain new and useful Improvements in Vehicle Driving Mechanism, of which the following is a full, clear, concise, and exact description, reference being had to the accompanying drawings, forming a part of this specification.

My invention relates to vehicle driving mechanism and has for its general object the provision of a device by means of which driving connection may be had with the wheels of an automobile, and which will permit one of two driven wheels to travel ahead of the other when the vehicle departs from a straight line of travel. Broadly, the device of my invention consists of a pair of driven members secured to adjacent ends of a pair of rear axle sections of a motor driven vehicle, each of the driven members having an interlocking member slidably mounted therein arranged to connect with the driving member connected with the motor of the vehicle by means of a suitable drive shaft. Power is transmitted when traveling in a straight line to both of the driven members, and thus to the wheels, but when departing from a straight line of travel, for instance, in turning a corner, one rear wheel must be permitted to travel faster than its associated wheel and I have arranged automatic means whereby this is permitted and which eliminates the possibility of "cross locking." When one wheel is permitted to travel ahead of its associated wheel, power is transmitted to the slower moving wheel but immediately upon resuming a straight line of travel, power is again transmitted to both wheels.

Important objects of my invention are simplicity, sturdiness, and cheapness, as will be brought out more fully hereinafter.

Another advantage of my construction is that the side thrust inherent in the type of differential in almost universal use is eliminated.

I have also provided dovetail teeth on the interlocking members and the driving member which makes the driving connection positive.

My invention also provides several novel features of construction which will appear more readily as the specification progresses and by reference to the accompanying drawings, in which Figure 1 is a vertical cross sectional view of the driving mechanism;

Fig. 5 is a plan view of the controller ring showing its cam faces and the method of connection;

Fig. 6 is a fragmentary sectional view of the driving member and showing the method of carrying the controller ring;

Fig. 6A is a fragmentary perspective view of the driving ring illustrating one of the openings arranged to receive the controller ring;

Figs. 7 and 8 are plan views to show positions assumed by the parts in operation; and Fig. 9 is an enlarged plan view to show the positions assumed by the parts in making a turn.

Similar characters of reference refer to similar parts throughout the several views.

Figure 1:
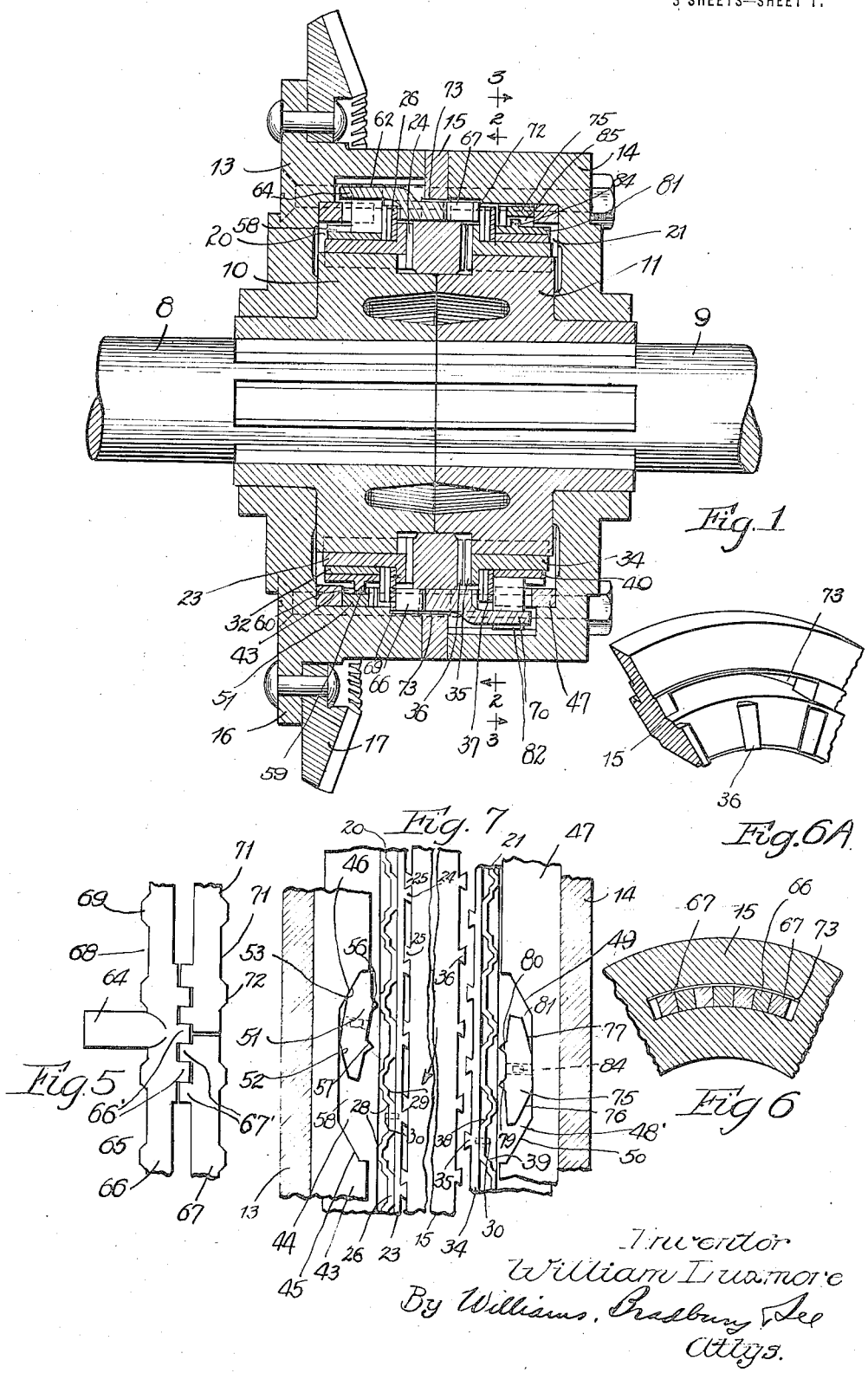
Figure 2:
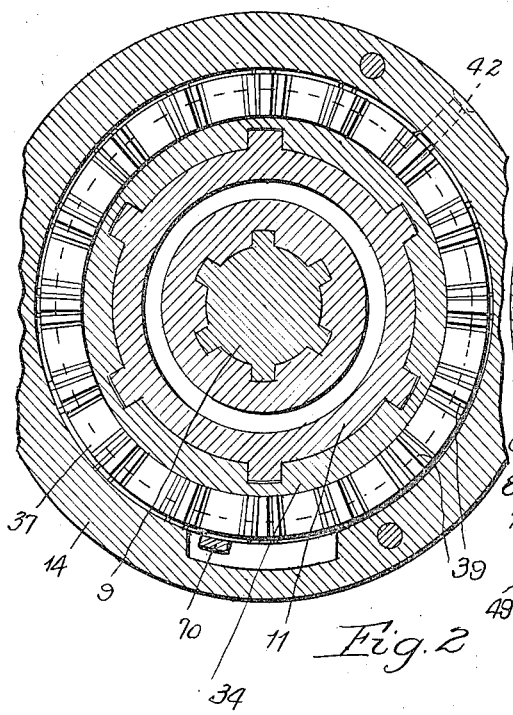
Fig. 2 is a cross sectional view taken on the line 2—2 of Fig. 1, looking in the direction indicated by the arrows.

Referring first to Fig. 1, I have illustrated a pair of rear axle sections 8 and 9 having splined connection with a pair of driven members 10 and 11. Forming a housing for the entire mechanism is a pair of casing members 13 and 14 which have secured between them by bolts a driving member 15 in the form of a ring. The casing member 13 as illustrated has a flange portion 16 to which a bevel gear 17 may be secured by rivets. Power is transmitted to the driving member 15 through the bevel gear 17 by means of a pinion mounted at one end of a drive shaft connected with the motor of the vehicle. Slidably disposed in the driven members 10 and 11 is a pair of interlocks 20 and 21 which are arranged to effect driving connection between the driven members and the driving member 15. The interlock 20 comprises a clutch member 23 provided with dovetail teeth 24 adapted to mesh with the dovetail teeth 25 of the driving member 15. Secured to the clutch member 23 and rotatable therewith is a lock ring 26 having cam faces 28 and 29 on opposite sides thereof, the object of which will appear presently. Although any suitable means may be employed, I have provided pins 30 connecting the lock rings with the clutch members. A ring 32 is shrunk onto the clutch member 23 also to hold the lock ring 26 in engagement with the clutch member. The interlock 21 is similar in construction to the interlock 20 and comprises a clutch member 34 having dovetail teeth 35 arranged to mesh with the dovetail teeth 36 of the driving member 15. A lock ring 37 is also provided having cam faces 38 and 39 on opposite sides thereof and held in place by a ring 40 and pins 30.

Figure 3:
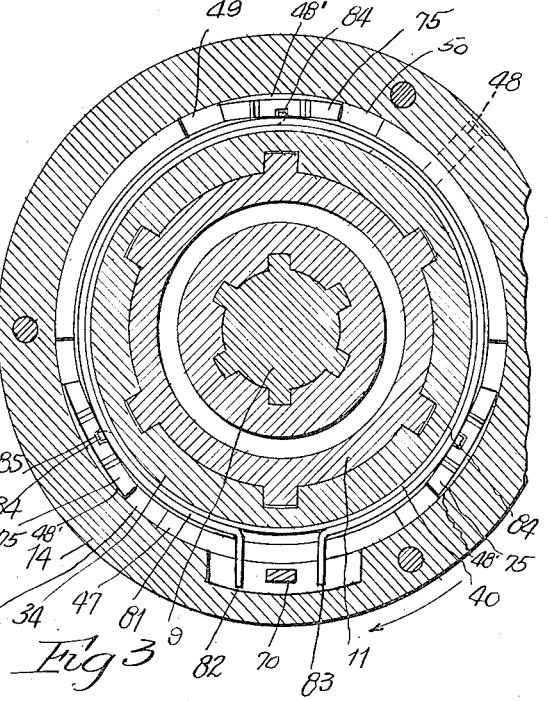
Fig. 3 is a cross sectional view taken on the line 3—3 of Fig. 1, and looking in the direction indicated by the arrows.
Figure 4:
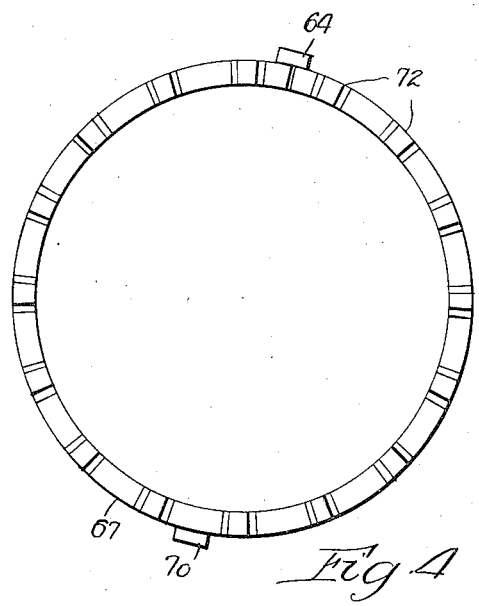
Fig. 4 is a side elevational view of the controller ring which I employ.

Secured to the casing 13 by means of a pin 42, is an abutment member 43, being provided with a plurality of openings 44, each of the openings having walls provided with cam surfaces 45 and 46. Although any suitable number of openings may be employed in the abutment member I have found it desirable to provide three. A similar abutment member 47 is secured to the casing member 14 by means of a pin 48 and is also provided with openings 48', having cam faces 49 and 50. Disposed within each of the openings 44 is a locking timer 51, provided with cam faces 52 and 53 on their outer side, and cam surfaces 56 and 57 on their inner side. The locking timers 51 are operable together by means of a tension ring 58 disposed around the interlock and having a spring fit and having ears 59 extending radially into slots 60 in the under side of the timers. As illustrated in Fig. 1 the tension ring 58 has a pair of free ends one of which is seen at 62, between which ends an arm 64 of the controller member 65 extends. The controller member 65 comprises a ring 66 carrying the arm 64 and a ring 67 carrying the arm 70, the rings being provided with teeth 66' and 67' respectively, meshing at two points diametrically opposite. If desired, the rings 66 and 67 may be punched as flat pieces and then given a circular conformation bringing the opposite ends together, as shown in Figs. 1, 4 and 5. The ring 66 has a plurality of depressions 68 and projections 69, which projections are arranged to extend between the cam faces 29 of the lock ring 26. Similar depressions 71 and projections 72 are provided for the ring 67 and the projections are arranged for disposition between the cam faces 38 of the lock ring 37. As shown in Figs. 1, 6 and 6ᴬ, the driving ring has a pair of openings 73, positioned diametrically opposite each other for the reception of the toothed portions of the controller rings 66 and 67. The abutment member 47 also accommodates a plurality of locking timers 75, having cam faces 76 and 77 on their outer side and cam faces 79 and 80 on their inner side. A tension ring 81, similar to ring 58 and having free ends 82 and 83 on opposite sides of the arm 70, is arranged to operate the locking timers 75 by radially extending ears 84, extending into slots 85 on the under side of the timers, as shown in Fig. 3. In operation, the tension rings 58 and 81 rotating with respect to the driving ring 15 will actuate the locking timers 51 and 75 against the cam faces of the abutment members 43 and 47, whereby the timers are presented to the cam faces 28 and 39 of the lock rings 26 and 37.

Figure 8:
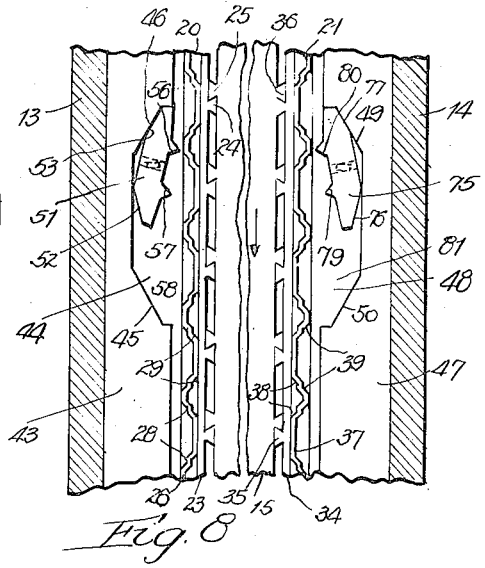

In Fig. 8, which is a plan view showing the positions assumed by the parts, the locking timers 51 and 75 take the positions illustrated when the vehicle is traveling in a straight line. As the tension rings 58 and 81 rotate, the locking timers 51 and 75 are actuated against the cam faces 46 and 49 of the abutment members 43 and 47, so that the cam faces 53 and 77 of the locking timers ride on the cams 46 and 49 of the members 43 and 47 to cause movement of the timers inwardly toward the cam faces 28 and 39 of the lock rings. When the lock rings 26 and 37 engage the faces 56 and 80 of the timers 51 and 75 the interlocks 20 and 21 will move toward the driving member to cause connection of the clutch members 23 and 34 with the dovetail teeth of the driving member 15. It will be understood that if the inner cam faces of the locking timers 51 and 75, or either of them, are not presented to the cam faces of the locking rings, but rather to the depressions in the same, as the lock rings 26 and 37 rotate, the inner cams of the locking timers will be presented to the next cam faces of the lock rings and cause longitudinal movement of the interlocks toward the driving member and cause the desired driving connection. Particular attention is called to the importance of the form of the locking timers 51 and 75, which must be such as to insure the operation of the interlocks 20 and 21 so that the teeth 24 and 35 of the clutch members 23 and 34 are thrown in engagement with the teeth 25 and 36 of the driving member 15 with a full face contact. With the use of my arrangement, the possibility of partial locking or movement which would break the dovetail teeth is eliminated. The clutch members 23 and 34 are moved toward the driving member when the teeth of the clutch members are between the teeth of the driving member and when the projections 69 and 72 are between the cam faces 29 and 38 of the lock rings. The inner cams of the locking timers 51 and 75 must therefore be so positioned that movement may be effected when the path for movement is clear.

Referring to Fig. 9, wherein I have illustrated the positions of the parts assumed when the vehicle is traveling forwardly and making a turn to the left, (see arrow) it will be seen that the locking timers 75 have assumed a position which will permit movement of the interlock 21 independent and ahead of the driving member 15. In traveling forward in a straight line, the timers 51 will have their cam faces 52 in engagement with the cam faces 45 of the abutment member 43, and the locking timers 75 will assume a similar position whereby the clutch members 23 and 34 are thrown into engagement with the driving member 15 to drive the wheels connected with the rear axle sections 8 and 9. When the wheel connected to the rear axle section 9 rotates faster than its associated wheel, as is necessary in making a forward turn to the left, the cam faces 38 of the lock ring 37 will engage the cams of the projections 72, on the controller, which will cause the interlock 21 to travel outwardly until disengagement from the driving member 15 is effected, whereupon independent movement of the wheel connected to axle section 9 is permitted. When the vehicle again resumes travel in a straight line, the locking timers 75 will engage the abutment member 47, whereupon the interlock 21 will be caused to engage the driving member, by reason of the lock ring 37 engaging the cams of the locking timers 75. Power is then transmitted to both of the rear wheels. By reason of the fact that the space between the free ends of the tension rings 58 and 81 is greater than the width of the controller arms 64 and 70, movement of the timers 51 and 75 to a neutral position is permitted. This is the position taken when one wheel rotates faster than the other.

Fig. 3 shows the position of the controller arm 70 between the free ends 82 and 83 of the tension ring 81. Referring to this view let us assume travel in a straight line, going forward in the direction indicated by the arrow, then the controller arm 70 will be engaged by the free end 82 of the tension ring 81. When the parts are thus arranged the cams of the abutment members 43 and 47 will be engaged by the locking timers 51 and 75, which are presented to the lock members 26 and 37, but when the driven member 11 rotates faster than the other the tension ring 81 being connected therewith will advance until the free end 83 engages the controller arm 70. The distance advanced is such that the locking timers 75 are brought to a neutral position which permits independent movement of the associated driven member. The engagement of the free end 83 with the controller arm 70 prevents the locking timers 75 from advancing beyond a neutral position, which if permitted would cause the lock rings to operate the interlocks into engagement with the driven member, thus causing a cross lock.

In Fig. 7 I have illustrated the positions assumed by the parts when going in a reverse direction, and making a turn in the direction indicated by the arrow, which necessitates faster rotation of the driven member 11. In this instance the locking timers 51 will engage the abutment member 43 and cause the interlock 20 to connect with the driving member 15. The cams of lock ring 37 rotating ahead will engage projections 72 of the controller and actuate the interlock 21 outwardly so that the driven member 11 connected with the axle 9 will be permitted to travel independent of the driving member in a manner similar to that as described in connection with Fig. 9.

Although I have not drawn and described a turn requiring the faster rotation of the wheel attached to the rear axle section 8, it will be apparent that similar movements are performed by its associated parts as are performed by the parts connected with axle 9.

Having thus described my invention, what I claim and desire to secure by Letters Patent of the United States is:

1. A device of the class described, comprising a driving member, teeth flaring outwardly from their roots carried by the driving member, a driven member, teeth flaring outwardly from their roots carried by the driven member, and devices for causing the teeth of both members to mesh or to clear each other.

2. A device of the class described, comprising a driving member, a pair of driven members, dove tail teeth carried by each of the members to facilitate connection between the driven members and the driving member, and devices for moving either one of the driven members out of mesh with the driving member.

3. A device of the class described, comprising a driving member, dove tail teeth carried by the driving member, a driven member and dove tail teeth carried by the driven member arranged to mesh with the teeth of the driving member, the teeth of both members being arranged to have lost motion connection with each other to enable the disengagement of the teeth when desired.

4. A device of the class described, comprising a driving member, teeth flaring outwardly from their roots carried by the driving member, a driven member disposed coaxial with the driving member, teeth flaring outwardly from their roots carried by the driven member and devices for causing the teeth of both members to mesh or to clear each other.

5. A device of the class described, comprising a driving member, a pair of driven members disposed coaxial with the driving member, dove tail teeth carried by each of the members to facilitate connections between the driven members and the driving member and devices for moving either one of the driven members out of mesh with the driving member.

6. A device of the class described, comprising a driving member, dove tail teeth carried by the driving member, a driven member disposed coaxial with the driving member and dove tail teeth carried by the driven member arranged to mesh with the teeth of the driving member, the teeth of both members being arranged to have lost motion connection with each other to enable the disengagement of the teeth when desired.

7. A device of the class described, comprising a driving member, a pair of driven members, teeth carried by each of the members for affording mechanical connection between the driving and driven members, and means distinct from said teeth and controlled by either driven member for disconnecting the faster moving driven member from the driving member when one of the driven members is rotated ahead of the driving member.

8. A device of the class described, comprising a driving member, a pair of driven members, teeth carried by each of the members for affording mechanical connection between the driving and driven members and means distinct from said teeth and controlled by either driven member for entirely disengaging the teeth of the faster moving driven member from the teeth of the driving member when one of the driven members is rotated ahead of the driving member.

9. Differential mechanism comprising a driving member provided with teeth, a pair of driven members disposed coaxial with the driving member, each of the driven members having teeth adapted to mesh with the teeth of the driving member, said driven members being provided with cams and a toothed controller arranged to mesh with the cams of the driven members for disconnecting the faster moving driven member from the driving member when one of the driven members is rotated ahead of the driving member.

10. Differential mechanism comprising a driving member provided with dove tail teeth, a pair of driven members disposed coaxial with the driving member, each of the driven members having dove tail teeth adapted to mesh with the teeth of the driving member, said driven members being provided with cams, and a toothed controller arranged to mesh with the cams of the driven members for disconnecting the faster moving driven member from the driving member when one of the driven members is rotated ahead of the driving member.

11. Differential mechanism, comprising a driving member, a pair of driven members disposed coaxial with the driving member, teeth carried by the driving member, teeth carried by the driven members arranged to mesh with the driving member teeth, the teeth of each driven member having a lost motion connection with the teeth of the driving member to permit a limited angular movement of each of the driven members relative to the driving member, and a controller arranged to disconnect the faster moving driven member from the driving member when one of the driven members is rotated ahead of the driving member.

12. Differential mechanism, comprising a driving member, a pair of driven members disposed coaxial with the driving member, teeth carried by the driving member, teeth carried by each of the driven members arranged to mesh with the teeth of the driving member, the teeth of each driven member having a lost motion connection with the teeth of the driving member to permit limited angular movement of each of the driven members relative to the driving member, and means for disconnecting the faster moving driven member from the driving member when one of the driven members is rotated ahead of the driving member.

13. A device of the class described, comprising a driving member having clutch teeth, a pair of driven members co-axial with the driving member, a clutch member secured to each of the driven members and arranged to slide longitudinally thereon, each of the clutch members being provided with clutch teeth for engagement with the teeth of the driving member, means for automatically locking the clutch members with the driving member when a load is placed upon the driven members, and devices distinct from said teeth and for disconnecting the faster moving clutch member from the driving member when one of the driven members is rotated ahead of the driving member.

14. A device of the class described, comprising a driving member having dove tail clutch teeth, a pair of driven members disposed co-axial with the driving member, a clutch member secured to each of the driven members and arranged to slide longitudinally thereon, each of the clutch members being provided with dove tail clutch teeth for engagement with the teeth of the driving member, means for automatically locking the clutch members with the driving member when a load is placed upon the driven members, and devices for disconnecting the faster moving clutch member from the driving member when one of the driven members is rotated ahead of the driving member.

15. A device of the class described, comprising a driving member having dove tail clutch teeth, a pair of driven members disposed coaxial with the driving member, a clutch member secured to each of the driven members and arranged to slide longitudinally thereon, each of the clutch members being provided with dove tail clutch teeth for engagement with the teeth of the driving member, means for automatically locking the clutch members with the driving member when a load is placed upon the driven members, and a toothed controller projecting into and supported by the driving member for disconnecting the faster moving clutch member from the driving member when one of the driven members is rotated ahead of the driving member.

16. A device of the class described, comprising a driving member having clutch teeth, a pair of driven members disposed coaxial with the driving member, a clutch member secured to each of the driven members and arranged to slide longitudinally thereon, each of the clutch members being provided with clutch teeth for engagement with the teeth of the driving member, means for automatically locking the clutch members with the driving member when a load is placed upon the driven members, a toothed controller supported by the driving member, and a cam carried by the controller for disconnecting the faster moving clutch member from the driving member when one of the driven members is rotated ahead of the driving member.

17. Differential mechanism comprising a driving member, a pair of driven members mounted coaxial with the driving member, teeth carried by the driving member, and teeth carried by the driven members for engagement with the teeth of the driving member, said teeth being of a shape to cause thrust of the driven members toward the driving member when they are connected with and rotated by the driving member.

18. A differential mechanism comprising a pair of driven members, a driving member mounted between said driven members, means for detachably connecting said driving member with said driven members, comprising means for thrusting said driven members toward said driving member when said driven members are connected with said driving member and driven thereby.

19. Differential mechanism comprising a driving member, a pair of driven members mounted coaxial with the driving member and adapted to move toward and from the driving member, teeth carried by the driving member, and teeth carried by the driven members for engagement with the teeth of the driving member, said teeth being of a shape to cause thrust of the driven members toward the driving member when they are connected with and rotated by the driving member.

20. A vehicle driving mechanism, comprising a driving ring provided with dove tail teeth, a pair of driven members, a pair of interlocks each comprising a clutch member having dove tail teeth adapted to mesh with the teeth of the driving ring and a lock ring provided with cam faces on each side thereof, a pair of abutment members having cam surfaces, a pair of tension rings, a plurality of locking timers for each of said tension rings, and a controller ring provided with cam faces, said tension rings being arranged so that upon rotation of the driven members the locking timers will engage the abutment members and be presented to the cams of the lock rings, whereby the clutch member is thrown into engagement with the driving ring, the cams of the lock rings being arranged so that the cams of the faster moving lock ring will engage the cams of the controller ring to cause disengagement of the clutch member from the driving ring.

21. A vehicle driving mechanism, comprising a driving ring provided with dove tail teeth, a pair of driven members, a pair of interlocks each comprising a clutch member having dove tail teeth adapted to mesh with the teeth of the driving ring, and a lock ring provided with cam faces on each side thereof, a pair of abutment members having cam surfaces, a pair of tension rings, and a plurality of locking timers for each of said tension rings, said tension rings being arranged so that upon rotation of the driven members the locking timers will engage the abutment members and be presented to the cams of the lock rings, whereby the clutch members are thrown into engagement with the driving ring.

22. A vehicle driving mechanism, comprising a driving member provided with dove tail teeth, a pair of driven members, a clutch member for each of said driven members, said clutch members having dove tail teeth adapted to mesh with the teeth of the driving member, a lock ring connected with each of said clutch members and having cam faces, a pair of cam members, a pair of tension members, locking timers operable by said tension members to engage the cam members, and a controller member mounted in the driving member and having cam faces, said tension members being arranged so that when the driven members rotate the lock members engage the locking timers and cause connection of the clutch members with the driving member, the cams of the lock members being arranged so that the cams of the faster moving lock ring will engage the cams of the controller member to cause disengagement of the clutch member from the driving member.

23. A vehicle driving mechanism, comprising a driving member, a pair of driven members, a clutch member for each of said driven members, a lock ring connected with each of said clutch members and having cam faces, a pair of cam members, a pair of tension members, locking timers operable by said tension members to engage the cam members, and a controller member mounted in the driving member and having cam faces, the said tension members being arranged to actuate the locking timers against the cam members, whereby the lock members engage the locking timers and cause connection of the clutch members with the driving member.

24. A vehicle driving mechanism, comprising a driving member, a pair of driven members, a clutch member for each of said driven members, a lock ring connected with each of said clutch members and having cam faces, a pair of cam members, a pair of tension members, locking timers operable by said tension members to engage the cam member, and a controller member having cam faces, said tension members being adapted to cause an arrangement of the locking timers with the cam member, whereby the lock members engage the locking timers and cause connection of the clutch members with the driving member, the cams of the lock members being arranged so that the cams of the faster moving lock member will engage the cams of the controller member to cause disengagement of the clutch member from the driving member.

25. A vehicle driving mechanism, comprising a driving member, a pair of driven members, a pair of interlocking members arranged for connection to the driving member and provided with cam means, an abutment member, a pair of tension members, locking timers operable by said tension members to engage the abutment member, and a controller member having cam means, the cam means of the interlocking members being arranged so that the cam means of the faster moving interlocking member will engage the cam means of the controller member to cause disengagement of the interlocking member from the driving member.

26. A vehicle driving mechanism, comprising a driving member, a pair of driven members, a pair of interlocking members arranged for connection to the driving member and provided with cam means, a tension member for each of said interlocking members, a pair of abutment members, said tension members being arranged upon rotation of the driven members to actuate the locking timers against the abutment members whereby the interlocking members may be connected to the driving member.

27. A vehicle driving mechanism, comprising a driving member, a pair of driven members, an interlocking member slidably carried by each of said driven members, each of said interlocking members comprising a clutch member and a lock member carried by the clutch member, a pair of cam locking means, locking timers operable within said cam locking means, and arranged upon rotation of said driven members to engage the abutment members and cause longitudinal movement of the interlocking members.

28. A vehicle driving mechanism, comprising a driving member, a pair of driven members, an interlocking member carried by each of said driven members, each of said interlocking members comprising a clutch member and a lock member carried by the clutch member, a pair of cam locking means, a locking timer operable within said cam locking means, and a pair of tension members, said tension members being connected with said locking timers and adapted when rotated to actuate the timers against the cam locking means to cause the clutch member to engage the driving member.

29. A vehicle driving mechanism, comprising a driving ring, a pair of driven members, an interlocking member carried by each of the driven members, each of said interlocking members comprising a clutch member and a lock member, said lock member having cam faces, a pair of cam locking rings, a pair of tension rings, and a locking timer connected to each of said tension rings, said tension rings being arranged upon rotation of the driven members to cause longitudinal movement of the interlocking members.

In witness whereof, I hereunto subscribe my name this 12th day of April, 1918.

WILLIAM LUXMORE.

Witnesses:
LAMAR MIDDLETON,
ALBIN H. AHLBERG.